(12) United States Patent
Xue et al.

(10) Patent No.: US 11,187,824 B2
(45) Date of Patent: Nov. 30, 2021

(54) METHOD AND DEVICE FOR SURFACE-BOREHOLE TRANSIENT ELECTROMAGNETIC DETECTION

(71) Applicant: Institute of Geology and Geophysics, Chinese Academy of Sciences, Beijing (CN)

(72) Inventors: Guoqiang Xue, Beijing (CN); Shucai Liu, Beijing (CN); Zhihai Jiang, Beijing (CN); Weiying Chen, Beijing (CN); Jianhua Yue, Beijing (CN); Qingyun Di, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 614 days.

(21) Appl. No.: 16/025,106

(22) Filed: Jul. 2, 2018

(65) Prior Publication Data
US 2020/0003928 A1 Jan. 2, 2020

(51) Int. Cl.
*G01V 3/26* (2006.01)
*G01V 3/34* (2006.01)

(52) U.S. Cl.
CPC . *G01V 3/26* (2013.01); *G01V 3/34* (2013.01)

(58) Field of Classification Search
CPC ... G01V 3/26; G01V 3/34; G01V 3/20; G01V 3/081
See application file for complete search history.

(56) References Cited

U.S. PATENT DOCUMENTS

| | | | | |
|---|---|---|---|---|
| 4,875,015 A * | 10/1989 | Ward | | G01V 3/20 324/323 |
| 5,563,513 A * | 10/1996 | Tasci | | G01V 3/02 324/359 |
| 6,314,373 B1 * | 11/2001 | Prasser | | G01N 27/07 324/691 |
| 2002/0133944 A1 * | 9/2002 | Lopata | | H05K 7/1061 29/868 |
| 2015/0002158 A1 * | 1/2015 | Tayart De Borms | .. | G01V 3/081 324/344 |
| 2018/0320509 A1 * | 11/2018 | Skinner | | G01V 3/26 |

* cited by examiner

*Primary Examiner* — Mohamed Charioui
*Assistant Examiner* — Christine Y Liao
(74) *Attorney, Agent, or Firm* — Maier & Maier, PLLC

(57) ABSTRACT

The disclosure pertains to the field of exploration based on electromagnetic method, and in particular relates to a method and device for surface-borehole transient electromagnetic detection, aiming at solving the problem that the loop source device cannot effectively detect the high-resistance layer. The device according to the disclosure includes grounded conductor wires as emission sources and underground receiving devices as receiving sources; wherein the grounded conductor wires are arranged on the ground; an existing borehole on the ground or an existing underground roadway is used, and receiving probes are arranged point by point in the borehole direction or in the horizontal direction of the roadway; the grounded conductor wires are composed of three sets of grounded conductor wires, wherein two sets of the grounded conductor wires are arranged in parallel with each other and perpendicular to the third set of the grounded conductor wires.

2 Claims, 6 Drawing Sheets
(1 of 6 Drawing Sheet(s) Filed in Color)

| unit of stratum | | | | histogram | accumulated depth (m) | seam thickness (m) | Lithology and deposition characteristics | resistivity (Ωm) |
|---|---|---|---|---|---|---|---|---|
| erathem | system | series | formation | | | | | |
| Cenozoic (Kz) | | | | | 23.20 | 23.2 | mainly composed of gravel layer, sand layer and clay layer | 10-40 |
| Paleozoic (Pz) | Permian (P) | Lower series (P1) | Lower Shihezi Formation (P1x) | | 117.07 | 93.87 | apricot and yellow-green sandstone and mudstone interbed, mainly composed of sandstone | 20---90 |
| | | | Shanxi Formation (P1s) | | 218.43 | 101.36 | ashgrey sandstone, gray sandy mudstone, containing thin coal seam, mainly composed of mudstone | 20---70 |
| | Carboniferous (C) | Upper series (C3) | Taiyuan Formation (C3t) | | 259.09 | 40.66 | grey sandstone and gray-black mudstone interbed | >90 |
| | | | | | 266.14 | 7.05 | No. 4 coal seam | |
| | | | | | 307.62 | 41.48 | grey sandstone | |
| | | | | | 321.81 | 14.19 | No. 9 coal seam | |
| | | | | | 350 | 28.19 | muddy sandstone and mudstone interbed | |
| | | Middle series (C2) | Benxi Formation (C2b) | | 386.15 | 36.15 | grey sandy mudstone, aluminous mudstone, limestone and thin coal seam, and Shanxi-type iron ore at the bottom | 75 |
| | Ordovician (O) | Middle series (O2) | Shangmajiagou Formation (O2s) | | | 4 | shallow marine carbonate rock formation, mainly composed of limestone and marl, containing dolomite | >500 |

Fig. 7

METHOD AND DEVICE FOR SURFACE-BOREHOLE TRANSIENT ELECTROMAGNETIC DETECTION

FIELD

The present disclosure pertains to the field of exploration based on electromagnetic method, and in particular relates to a method and device for surface-borehole transient electromagnetic detection.

BACKGROUND

The transient electromagnetic method (referred to as TEM for short) is a time-domain artificial source electromagnetic detection method which is established based on the principle of electromagnetic induction. It uses an ungrounded loop or a grounded conductor wire to emit a primary field underground. After the primary field is shut down, a variation of induced secondary field, generated by underground medium, with time is measured so as to achieve a geophysical exploration method for finding various geological targets.

FIG. 1 shows a diagram of a working device in the conventional transient electromagnetic method using a ground surface loop source, in which a central loop device is used more frequently, that is, a loop Tx is arranged on the ground surface, and measurement is performed at the center point Rx of the loop. Since this device is very simple and is easy to interpret, it has received widespread applications.

However, when receiving is performed on the ground surface, the electromagnetic field has to propagate from an anomaly position to a ground surface receiving device so that it can be collected. Both the time and travel of the propagation of the electromagnetic field are long, and they may be easily affected by the inhomogeneous substances between the emission source and the receiving device. If the receiving can be realized at a position near the anomaly target body underground, the time and travel of the propagation of the electromagnetic field will be relatively short, the effects of the inhomogeneous substances between the emission source and the receiving device can be avoided to the greatest extent possible, and the maximum anomaly value can be observed, thus greatly improving the ability of target body detection.

In the conventional surface-borehole transient electromagnetic method, an ungrounded coil, which serves as an emission source Tx, is arranged on the ground surface near the borehole, and a magnetic probe is used as the receiving device Rx which measures the induced secondary field generated by the underground medium point by point in the direction of the borehole. The method principle thereof is illustrated in FIG. 2.

A bipolar pulse current is supplied in an ungrounded loop so as to excite an electromagnetic field. When excited by the electromagnetic field, an eddy current is generated by the underground medium as a result of induction, and when the pulse current of the emission loop transitions from the peak value to zero, the excitation field disappears immediately, and the induced eddy current in the underground medium does not disappear immediately; instead, there is an attenuation process. The characteristics of this process are related to the underground electrical structure. By studying the spatial and temporal variation characteristics of the induced secondary field in the borehole, the object of studying the distribution of electrical structure around the borehole can be achieved so that geological bodies beside the borehole and near the bottom of the borehole can be distinguished with high accuracy, or the spatial distribution and extending direction of the exposed ore body can be inferred.

In the surface-borehole TEM measurement, the observed characteristics of the surface-borehole TEM response curve are, on one hand, dependent on the conductivity and geometric forms of the conductive ore body, and on the other hand, they are relevant to the mutual positions of the emission loop, the conductor and the receiving probe. During practical operation, when there is insufficient data to accurately locate the anomaly bodies, a plurality of emission loops can be arranged at different orientations on the ground surface, such as Tx1~Tx5 as shown in FIG. 3, wherein ZK is a borehole. When each loop is excited, a probe is used in the borehole to perform measurement so as to obtain response curves with different characteristics. As such, more abundant geoelectrical information is obtained, which is helpful for the qualitative and quantitative interpretation of the anomaly bodies.

Since the fields have a cancelling-out effect on each other due to the symmetry of the loop source, energy is attenuated quickly in the stratum, the depth of detection is shallow, and it is difficult to lay the loop source when the side length is large. The loop source can only produce a tangential electric field component, making it easy to excite the induction current in the low resistance layer, which is very advantageous for detecting the low-resistance layer. However, for detecting the high-resistance layer, the loop source is not the best form of device.

SUMMARY

In order to solve the above problem in the prior art, namely to solve the problem that the loop source device cannot effectively detect the high-resistance layer, an aspect of the present disclosure proposes a device for surface-borehole transient electromagnetic detection, which includes emission sources and receiving devices, wherein the emission sources are emission wires arranged on the ground surface;

wherein the receiving devices are arranged underground point by point in a vertical direction or horizontal direction.

Further, the emission wires are three sets of grounded conductor wires, wherein two sets of the grounded conductor wires are arranged in parallel with each other and perpendicular to the third set of the grounded conductor wires.

Further, the emission wires are grounded conductor wires having a dual-square shape.

Further, the receiving devices are arranged underground point by point in the vertical direction in a vertical shaft, or the receiving devices are arranged point by point in the horizontal direction in a horizontal roadway.

Further, the receiving devices are located directly below an area surrounded by the emission wires.

Further, the emission wires excite an electromagnetic field underground through a bipolar rectangular pulse current.

According to another aspect of the present disclosure, a method for surface-borehole transient electromagnetic detection is proposed, which is based on the above described device for surface-borehole transient electromagnetic detection, wherein the apparent resistivity p is calculated using the following formula:

$$\rho = \frac{\mu}{4t\tau^2}$$

wherein

μ is a relative magnetic permeability;

t is a sampling delay;

τ is calculated using the following formula:

$$\frac{\partial h}{\partial t} = \frac{a^2}{\sqrt{\pi t}} \tau^3 \left[ e^{-(a^2+z_0^2)} \right]^{\tau^2}$$

h is the intensity of magnetic field;

$\frac{\partial h}{\partial t}$ is a known observed value;

$z_0$ is a vertical distance from the emission wire to the receiving device;

e is a natural constant;

a is a radius of circular loop, or a side length of rectangular loop, or the maximum value of a is approximately r;

r is a straight-line distance from a center point of the emission wires on the ground surface to a position of the receiving device in the vertical shaft, when the receiving devices are arranged underground point by point in the vertical direction in the vertical shaft; and r is a distance from a center point of the emission wires on the ground surface to a horizontal plane in which the receiving devices are located, when the receiving devices are arranged in the horizontal direction point by point in the underground roadway.

According to a third aspect of the present disclosure, a storage device is proposed, in which a plurality of programs are stored, the programs being adapted to be loaded and executed by a processor so as to implement the above described method for surface-borehole transient electromagnetic detection.

According to a fourth aspect of the present disclosure, a processing device is proposed, including:

a processor which is adapted to execute a plurality of programs; and a storage device which is adapted to store a plurality of programs;

wherein the programs are adapted to be loaded and executed by the processor so as to implement the above described method for surface-borehole transient electromagnetic detection.

Through the method for surface-borehole transient electromagnetic detection of the present disclosure, the electric field generated by the grounded conductor wires intersects with the stratum having different resistivity values, the induction current excited by the horizontal component is advantageous for the detection of the low-resistance body, and the charges induced by the vertical component in the electric interface of the stratum are advantageous for the detection of the high-resistance body. All the six components of the electromagnetic field in an orthogonal coordinate system have detection capabilities. The present disclosure provides more possibilities for the principle and method of information detection and extraction of deep large-scale ore deposits; the arrangement of long conductor wires not only exhibits greater flexibility, but also is advantageous for the detection of high-resistance target body.

BRIEF DESCRIPTION OF DRAWINGS

The patent or application file contains at least one drawing executed in color. Copies of this patent or patent application publication with color drawings will be provided by the Office upon request and payment of the necessary fee.

FIG. 7 is a histogram of the borehole of a mining area according to an example of the present disclosure;

DETAILED DESCRIPTION

Preferred embodiments of the present disclosure will be described below with reference to the accompanying drawings. It should be understood by those skilled in the art that these embodiments are only used to explain the technical principle of the present disclosure, and are not intended to limit the scope of protection of the present disclosure.

A device for surface-borehole transient electromagnetic detection according to an embodiment of the disclosure includes emission sources and receiving devices, wherein the emission sources are emission wires arranged on the ground surface, and the receiving devices are arranged underground point by point in a vertical direction or horizontal direction.

The emission wires are three sets of grounded conductor wires, wherein two sets of the grounded conductor wires are arranged in parallel with each other and perpendicular to the third set of the grounded conductor wires. The emission wires may also be grounded conductor wires having a dual-square shape when the receiving space is a substantially horizontal coal mine roadway or tunnel.

The device for surface-borehole transient electromagnetic detection according to the present disclosure adopts a grounded source instead of a loop source, that is, three sets of grounded conductor wires are arranged on the ground above the roadway as emission sources, and each of the three sets of conductor wires is used to emit respectively. Probes are used to measure an induced secondary field generated by the underground medium point by point along the direction of the roadway underground. A bipolar rectangular pulse current is supplied in the grounded conductor wires to excite an electromagnetic field underground. When excited by the electromagnetic field, an eddy current is generated by the underground medium as a result of induction, and when the pulse current of the emission loop transitions from the peak value to zero, the excitation field disappears immediately, and the induced eddy current in the underground medium does not disappear immediately; instead, there is an attenuation process. The characteristics of this process are related to the distribution of the underground electrical structure. By studying the spatial and temporal variation characteristics of the induced secondary field in the borehole, the object of studying the distribution of electrical structure around the roadway can be achieved so that the spatial distribution and extending direction of the target body can be inferred.

In order to describe the technical solutions of the present disclosure more clearly, the device and method for surface-borehole transient electromagnetic detection according to embodiments of the disclosure will be described below with reference to different conditions.

1. the receiving devices being placed in the borehole in the vertical direction.

Figure 1:
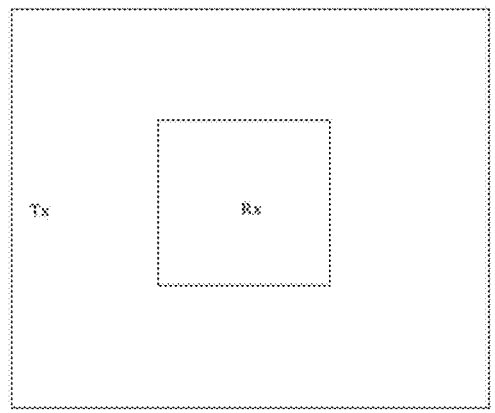
FIG. 1 is a schematic diagram of a working device of a conventional loop source transient electromagnetic method.
Figure 2:
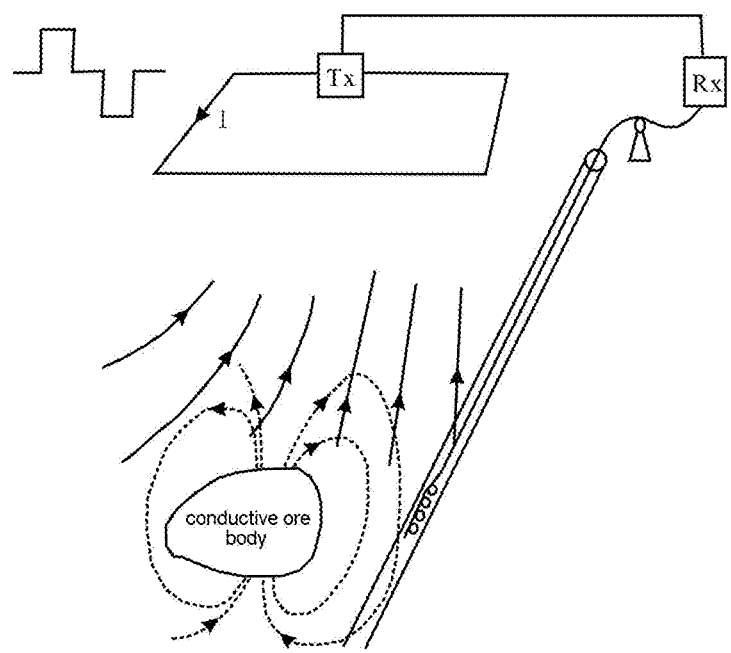
FIG. 2 is a schematic diagram illustrating the principle of surface-borehole transient electromagnetic method.
Figure 3:
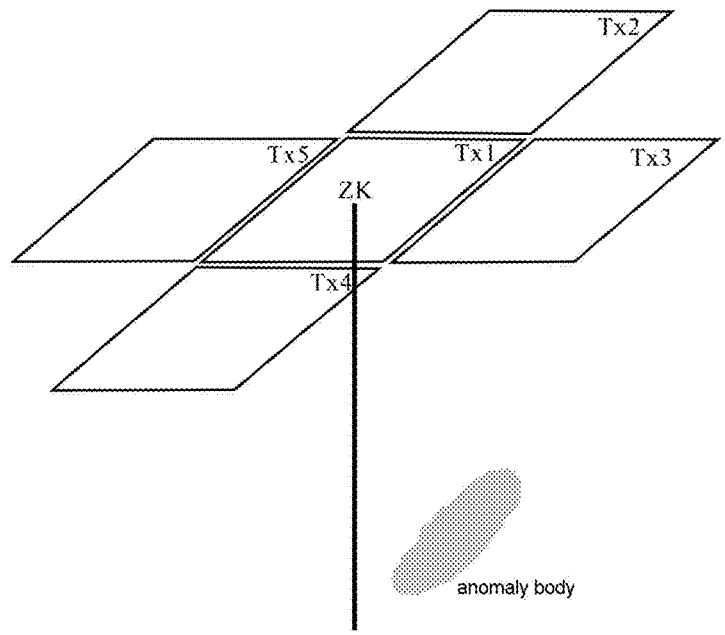
FIG. 3 is a schematic diagram illustrating the surface-borehole transient electromagnetic operation.
Figure 4:
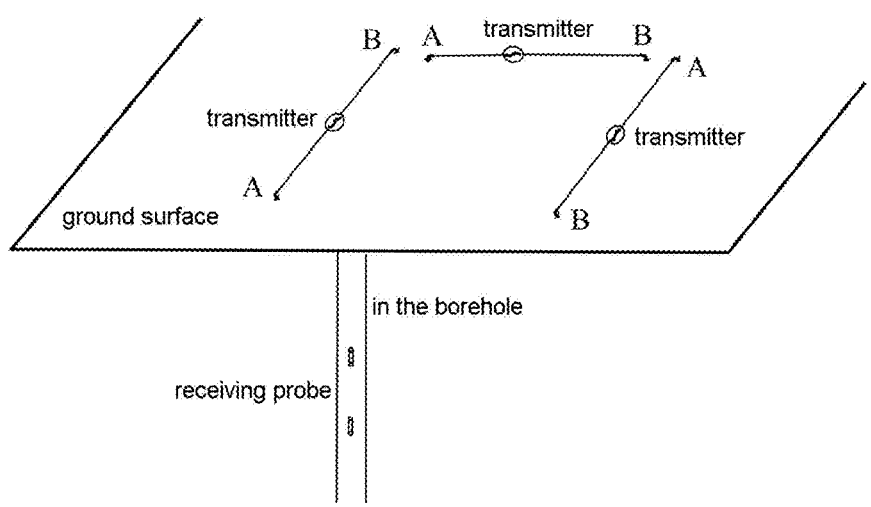
FIG. 4 is a schematic diagram of a device for surface-borehole (vertical) transient electromagnetic detection according to an embodiment of the present disclosure.

As shown in FIG. 4, the grounded conductor wires are arranged on the ground surface; the grounded conductor wires are composed of three sets of grounded conductor wires AB, wherein two sets of them are parallel with each other and are perpendicular to a third set. An existing borehole on the ground surface is used, and the receiving devices are arranged point by point in the borehole along the direction of the borehole (receiving probes are used in this embodiment). The length of the grounded conductor wires is 800 meters to 1500 meters. The emission source (the grounded conductor wire) has an emission power of 30 kilowatts. In this embodiment, the receiving probes can be placed point by point in a vertical shaft in the vertical direction, and the borehole in the vertical direction can be used as one of the vertical shafts in the disclosure.

Figure 5:
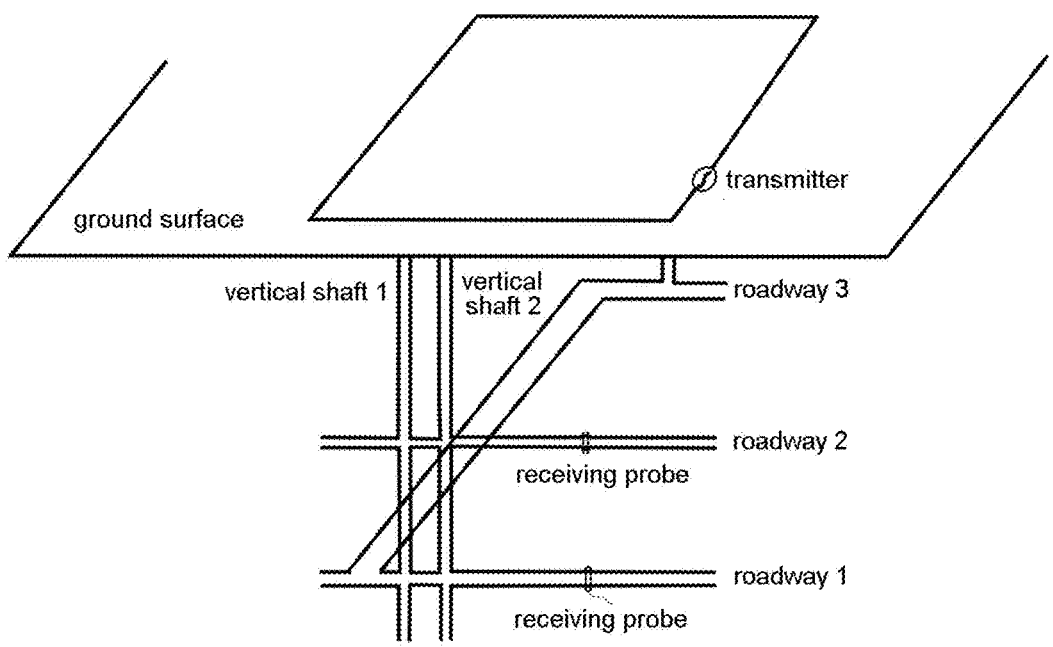
FIG. 5 is a schematic diagram of a device for loop source surface-roadway transient electromagnetic measurement according to an embodiment of the present disclosure.

When the receiving space is a substantially horizontal coal mine roadway or tunnel, the conventional surface-borehole observation equipment becomes what is shown in FIG. 5. That is, a larger coil is placed on the ground surface to increase the power supply current for the purpose of ensuring the depth of detection. Receiving probes are arranged in the extending direction of the roadway at different depths in the borehole, and detection signals are received. The reception signals are strong when the receiving probes are closer to the target body, and the resolution and detection accuracy can be improved, thus enhancing "side-viewing" ability. Meanwhile, a relative position of the emission coil on the ground and the receiving coil in the roadway is changed or a normal direction of the receiving coil is changed so as to facilitate detection of multi-layer gob area.

2. the receiving devices being placed in the roadway in the horizontal direction.

Likewise, since the fields have a cancelling-out effect on each other due to the symmetry of the loop source, the energy is attenuated quickly in the stratum, the depth of detection is shallow, and it is difficult to lay the loop source when the side length is large. The loop source can only produce a tangential electric field component, making it easy to excite the induction current in the low-resistance layer, which is very advantageous for detecting the low-resistance layer. However, for detecting the high-resistance layer, the loop source is not the best form of device.

Figure 6:
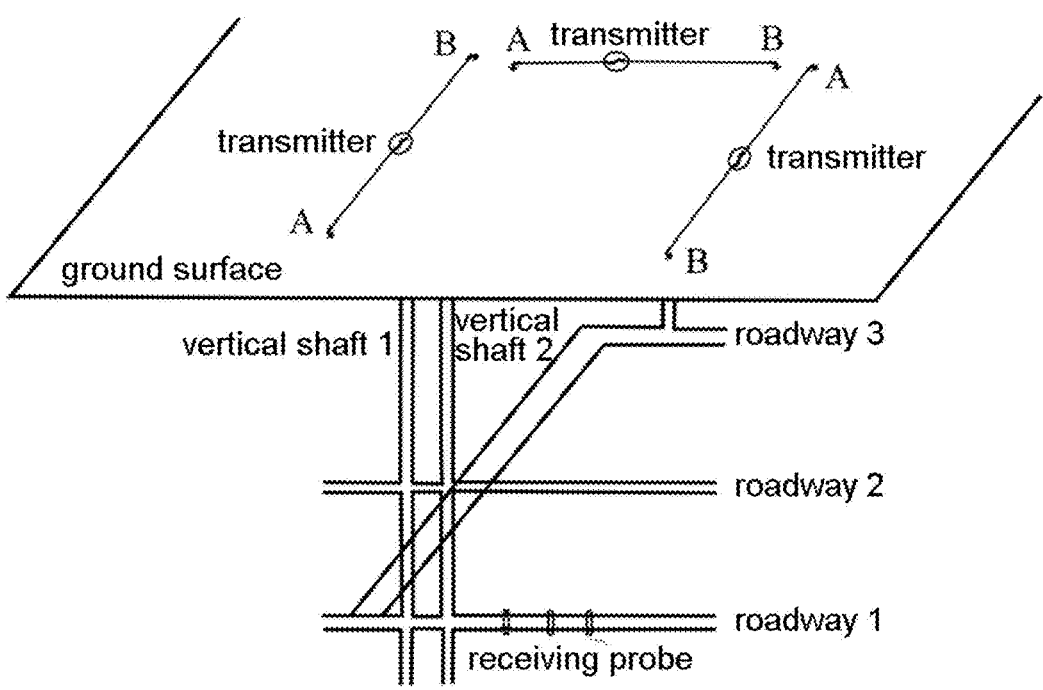
FIG. 6 is a schematic diagram of a device for surface-borehole (horizontal) transient electromagnetic detection according to an embodiment of the present disclosure.

As shown in FIG. 6, grounded conductor wires are arranged on the ground surface; the grounded conductor wires are composed of three sets of grounded conductor wires AB, wherein two sets of them are parallel with each other and are perpendicular to a third set. An existing roadway on the ground surface is used, and a plurality of receiving probes are arranged point by point in the roadway in the horizontal direction. The length of the grounded conductor wires is 800 meters to 1500 meters. The emission source (the long grounded conductor wire) has an emission power of 30 kilowatts.

The method for grounded source transient electromagnetic detection according to the disclosure will be described with reference to the following two embodiments.

1. calculation of the surface-borehole transient electromagnetic apparent resistivity.

For the surface-borehole and surface-roadway device, the conventional formula for the calculation of the ground apparent resistivity no longer applies.

For a circular loop, when the receiving point is located directly below the center of the emission coil, i.e., when the coordinate of the receiving point is (0, 0, z0), $$\frac{\partial h}{\partial t} = \frac{\tau^3}{\sqrt{\pi t}} a^2 e^{-\tau^2(a^2+z_0^2)} \quad (1)$$

wherein $$\tau = \left(\frac{\mu\sigma}{4t}\right)^{1/2},$$

h is the intensity of magnetic field, t is a sampling delay, a is a radius of circular loop, σ is conductivity, and μ is a relative magnetic permeability. Then, the apparent resistivity can be expressed as:

$$\rho = \frac{\mu}{4t\tau^2} \quad (2)$$

wherein μ is a relative magnetic permeability and t is a sampling delay.

Formula (1) can be expressed as a function of parameter:

$$\frac{\partial h}{\partial t} = \frac{a^2}{\sqrt{\pi t}} Y(\tau) \quad (3)$$

wherein h is the intensity of magnetic field, and Y(τ) is calculated using formula (4):

$$Y(\tau) = \tau^3 [e^{-(a^2+z_0^2)}]^{\tau^2} \quad (4)$$

wherein $z_0$ is a vertical distance from the emission wire to the receiving device, and e is a natural constant.

Therefore, the apparent resistivity defined by formula (2) can be calculated if the value of τ, which satisfies the formula (4), is obtained. During actual calculation, since $$\frac{\partial h}{\partial t}$$

is a known observed value, Y(τ) can be calculated using formula (3). Then, it is substituted into formula (4) to find the value of τ, and further the value of the apparent resistivity is obtained by using formula (2).

For the grounded source conductor wires, a may be a radius of circular loop, or a side length of a rectangular loop, or the maximum value of a is approximately r.

r is a straight-line distance from a center point of the emission wires on the ground surface to a position of the receiving device in the vertical shaft.

2. calculation of the surface-roadway transient electromagnetic apparent resistivity.

The difference of the calculation of the surface-roadway transient electromagnetic apparent resistivity from the calculation of the surface-borehole transient electromagnetic apparent resistivity is the definition of r. Herein, the receiving devices are arranged point by point in an underground roadway in the horizontal direction, and r is a distance from a center point of the emission wires on the ground surface to a horizontal plane in which the receiving devices are located.

A storage device according to an embodiment of the disclosure is provided, in which a plurality of programs are stored, the programs being adapted to be loaded and executed by a processor so as to implement the above described method for surface-borehole transient electromagnetic detection.

A processing device according to an embodiment of the disclosure is provided, which includes a processor which is adapted to execute a plurality of programs; and a storage device which is adapted to store a plurality of programs, wherein the programs are adapted to be loaded and executed by the processor so as to implement the above described method for surface-borehole transient electromagnetic detection.

Those skilled in the art can clearly understand that, for the convenience and conciseness of the description, as to the specific working process and related descriptions of the above-described storage device and processing device, reference may be made to the corresponding processes of the foregoing device and method embodiments, and a repeated description is not given herein.

For description of the technical effects of the disclosure, practical examples will be described below.

1. Geological Overview

A coal mine in Shanxi Province is located within the Pingshuo mining area on the eastern edge of the northern part of the Ningwu coalfield. Most of the earth's surface is covered by the Cenozoic Erathem and it is a typical loess hilly landform. From the bottom to the top, the Ordovician Shangmajiagou Formation, the Carboniferous Benxi Formation, the Carboniferous Taiyuan Formation, the Permian Shanxi Formation, the Lower Shihezi Formation, and the mid and late Pleistocene of the Cenozoic Erathem are developed in this coalfield, as shown in FIG. 7. The main coal-bearing stratum is the Carboniferous Taiyuan Formation with a total of 4 recoverable coal seams, which are coal seams NO. 4, 9, 11 and 12 in an order from top to bottom. The top of the No. 4 coal seam is sandstone, and a sandstone and mudstone interbed is located between the No. 4 and No. 9 coal seam with a seam spacing of about 60 m. Below the No. 9 coal seam is a sandstone and mudstone interbed, and the bottom of the No. 9 coal seam is 80 m away from the top boundary of the Ordovician limestone. The experimental site is located at 9103 working surface, with a surface elevation of approximately 1350 m. The working surface has a peripheral length length of 610 m, and a diagonal length of 200 m. The No. 9 coal seam is mined with a coal seam tilt of 6° to 7° and an inclination of 127°. The coal seam bottom at the northwest orientation of the working surface has an elevation of 1080 m, and 1020 m at the southeast orientation. According to existing data, the working surface is overlaid with No. 4 coal seam, and the floor of the coal seam has a height of 1080-1140 m. It has been partially mined empty. The transportation road and the air returning road of the No. 4 mining area diagonally pass through the working surface from above respectively.

2. Working Process

Figure 8:
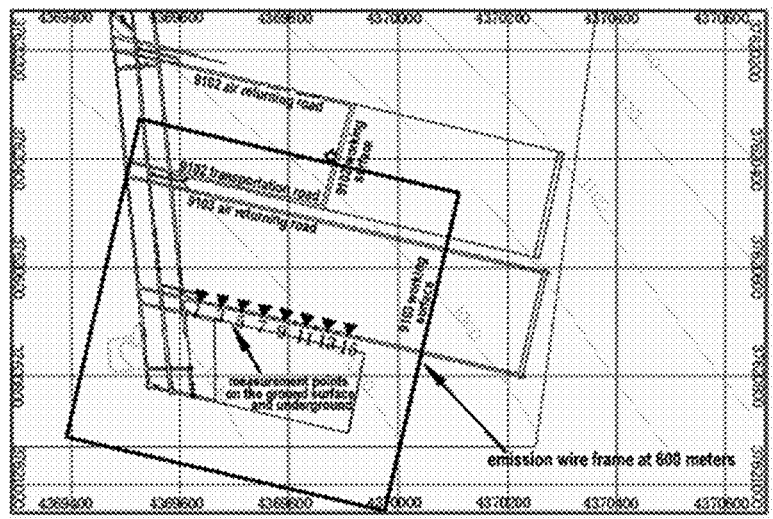
FIG. 8 is a schematic diagram of a device for transient electromagnetic detection according to an example of the present disclosure.

As shown in FIG. 8, a measurement line is arranged on the transport road of the 9103 working surface, with the position of gob area being known. The floor of the roadway has an elevation of 1020 m to 1030 m, and the start point is located at the opening of the transport road. 16 measurement points are arranged with a spacing of 20 m, which corresponds to the measurement points in the underground roadway. There are also 16 measurement points at the same positions on the ground surface with a spacing of 20 m. There are known gob areas at the first and second measurement points and measurement points 7-12. It is to be noted that when the measurement points are arranged, the measurement standards must be strictly followed so as to ensure the coincidence of measurement points on the ground surface and underground in the plane position. During the specific construction, taking into account a convenient arrangement of the emission coil, the actual side length of the emission coil is 600 m. The measurement lines both on the ground and in the underground roadway are located on the center line of the emission coil. An electrical prospecting instrument GDP-32 is used, the frequency is set at 16 Hz, the earliest sampling delay is 0.0609 ms, the latest sampling delay is 12.204 ms, the emission current is 13A, the off-time is set to be 600 s, and the equivalent receiving area of the receiving probe is 10000 m$^2$. In practical operation, the same set of transmitters are used to emit, and two sets of receivers are respectively used to receive on the ground and in the underground roadway simultaneously.

3. Result of Detection

Figure 9:
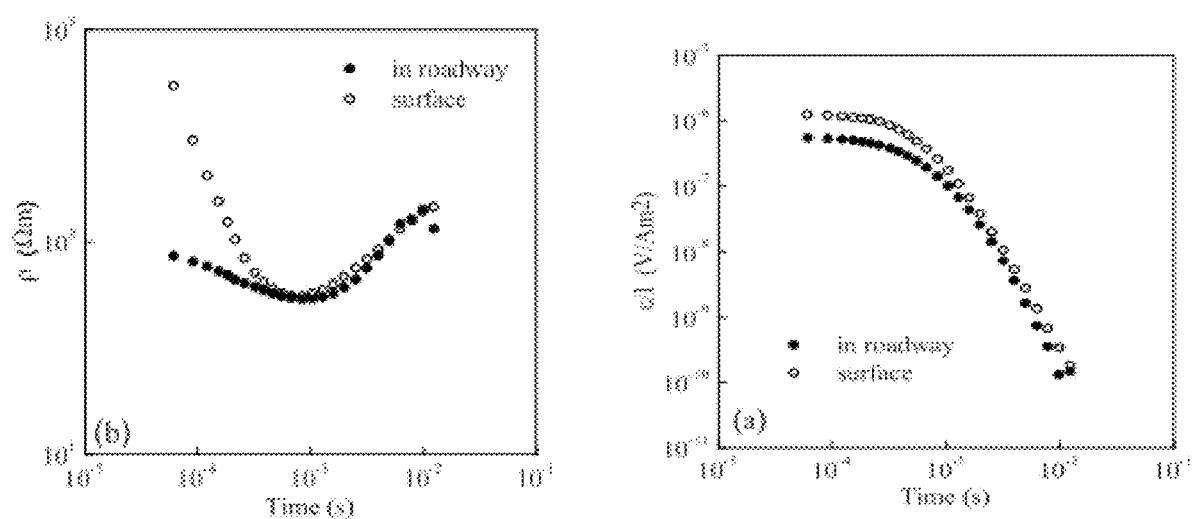
FIG. 9 is a curve of actual measurement at No. 5 measurement point according to an example of the present disclosure.

The measurement points on the ground and underground are coincident in the plane position. FIG. 9 shows a curve of the actually measured induced electromotive force and a curve of the apparent resistivity curve at No. 5 measurement point. The stratum is complete at this measurement point and there in no gob area. The solid point is the downhole measurement data, and the hollow point is the ground measurement data. FIG. 9(*a*) is a current curve of the actually measured induced electromotive force, and FIG. 9(*b*) is a curve of the actually measured apparent resistivity. During the detection, the estimation on the off-time was inaccurate. The instrument parameters were set to be 600 s, and the actual off-time was about 300 μs. As a result, no early data was collected. Therefore, the downhole data does not exhibit a trend of ascending first and descending later. From the curve of the induced electromotive force, the ground data and downhole data gradually converge after 1 ms. The quality of the downhole data is slightly worse than that of the ground data, and there is a jump. For the calculation of ground apparent resistivity, the conventional formula for calculating the apparent resistivity of the center loop is still used, and no oblique transition wave correction is performed. Therefore, the early data deformity is serious and approaches 1000 Ωm, which does not comply with the actual apparent resistivity value. For the calculation of downhole apparent resistivity, the calculation method proposed in the previous section is used. From a comparison between the curves of apparent resistivity, except for the early data, the variation forms of the curves are substantially consistent, beginning from about 500 μs. The curves of ground apparent resistivity and underground apparent resistivity substantially coincide, and exhibit substantially uniform electrical reflection of the stratum.

Figure 10A:
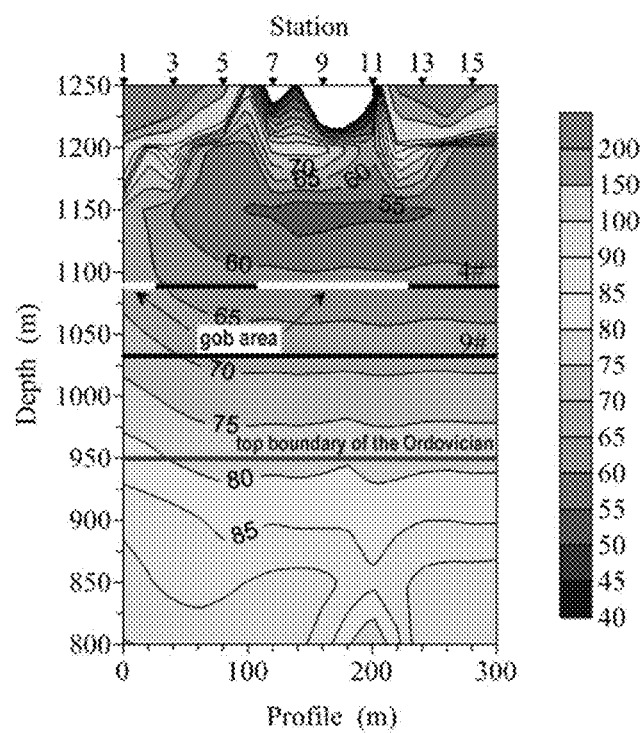
FIG. 10A is a sectional view of the apparent resistivity according to an example of the present disclosure.
Figure 10B:
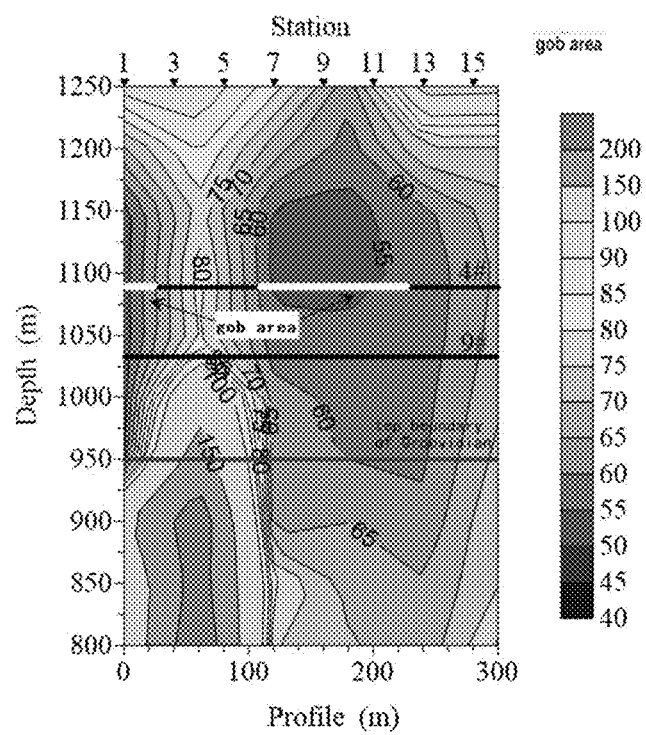
FIG. 10B is a sectional view of the apparent resistivity according to an example of the present disclosure.

FIG. 10 is a sectional view of the actually measured apparent resistivity, wherein FIG. 10A shows a result of ground surface detection, and FIG. 10B shows a result of surface-roadway detection. The result of ground surface detection basically reflects the trend of electrical variation (high→low→high) of the stratum in the detection area. The isolines of apparent resistivity contour in the transverse direction are smooth and continuous, with no obvious electrical transitions. There is no obvious low resistance anomaly in the two water accumulating gob areas of No. 4 coal seam. The result of surface-roadway detection shows that there is no trend of obvious electrical variation of the stratum in the longitudinal direction, but the electrical variation in the transverse direction is obvious. There is obvious low resistance anomaly in each of the two water accumulating gob areas. The ground surface is about 260 m away from No. 4 coal seam. The roadway in which the underground receiver is located is about 60 m away from No. 4 coal seam. Because of the proximity to the anomalous body, the surface-roadway is much better than the ground surface in terms of the detection effect of the two water accumulating gob areas of No. 4 coal seam. It can also be seen from the detection results that the determination of the transverse position of the low-resistance anomaly body by the surface-roadway is relatively accurate, but the distribution range of the low-resistance area in the longitudinal direction is relatively large, and it is difficult to accurately locate the depth position of anomaly.

It can be appreciated by those skilled in the art that the methods of various examples described with reference to the embodiments disclosed herein can be implemented with electronic hardware, computer software, or a combination thereof. In order to clearly illustrate the interchangeability of electronic hardware and software, the components and steps of the examples have been generally described in terms of functionality in the above description. Whether these functions are implemented in electronic hardware or software depends on the specific application of the technical solution and design constraints. Those skilled in the art can use different methods to implement the described functions for each specific application, but such implementations should not be construed as going beyond the scope of the present disclosure.

Hitherto, the technical solutions of the present disclosure have been described with reference to the preferred embodiments shown in the accompanying drawings. However, it can be easily understood by those skilled in the art that the scope of protection of the present disclosure is obviously not limited to these specific embodiments. Those skilled in the art can make equivalent changes or replacements to the related technical features without departing from the principle of the present disclosure, and the technical solutions after these changes or replacements will fall within the scope of protection of the present disclosure.

What is claimed is:

1. A method for surface-borehole transient electromagnetic detection, the method being based on a device for surface-borehole transient electromagnetic detection, wherein the device comprises emission sources and receiving devices, wherein the emission sources are emission wires arranged on the ground surface; and wherein the receiving devices are arranged underground point by point in a vertical direction or horizontal direction, and wherein the emission wires are three sets of grounded conductor wires, wherein two sets of the grounded conductor wires are arranged in parallel with each other and perpendicular to the third set of the grounded conductor wires, wherein the method comprises the following steps:
energizing the emission wires with a bipolar rectangular pulse current to excite an electromagnetic field underground;
obtaining observed value of the receiving devices;
calculating apparent resistivity based on the observed value using the following formula:

$$\rho = \frac{\mu}{4t\tau^2}$$

Wherein
$\mu$ is a relative magnetic permeability;
t is a sampling delay;
$\tau$ is calculated using the following formula:

$$\frac{\partial h}{\partial t} = \frac{a^2}{\sqrt{\pi t}} \tau^3 [e^{-(a^2 + \frac{2}{6})}]^{\tau^2}$$

h is the intensity of magnetic field;

$$\frac{\partial h}{\partial t}$$

is the observed value of the receiving devices;
$z_o$ is a vertical distance from the emission wire to the receiving device;
e is a natural constant;
the maximum value of a is approximately r; r is a straight-line distance from a center point of the emission wires on the ground to a position of the receiving device in the vertical shaft, when the receiving devices are arranged underground point by point in the vertical direction in the vertical shaft; and r is a distance from a center point of the emission wires on the ground to a horizontal plane in which the receiving devices are located, when the receiving devices are arranged in the horizontal direction point by point in the underground roadway.

2. A storage device, in which a plurality of programs are stored, the programs being adapted to be loaded and executed by a processor so as to implement the method for surface-borehole transient electromagnetic detection according to claim 1.

* * * * *